Figure 1:
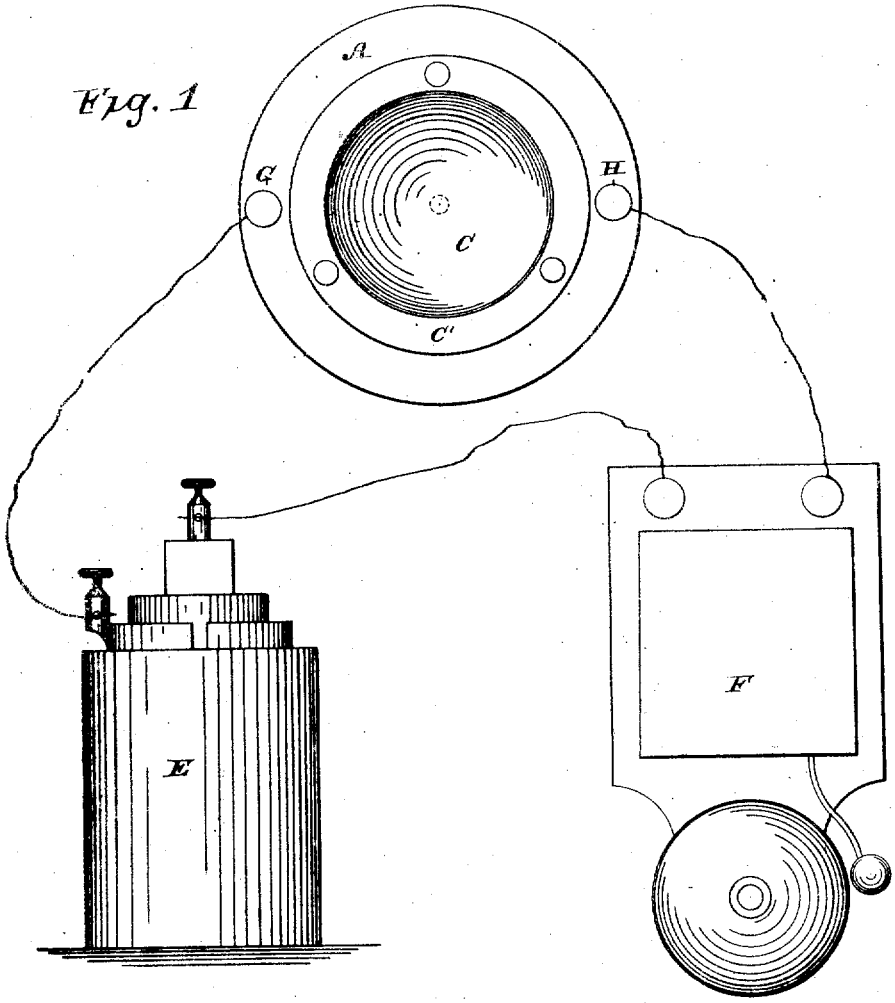

C. E. KELLS, Jr.

Assignor, by mesne assignments, to the NATIONAL AUTOMATIC FIRE ALARM COMPANY

ELECTRIC FIRE ALARM OR THERMOSTAT.

No. 10,791. Reissued Dec. 21, 1886.

WITNESSES

E. A. Newman.

C. M. Newman

INVENTOR

C. E. Kells Jr.

By his Attorneys

Baldwin Hopkins & Peyton

UNITED STATES PATENT OFFICE.

CHARLES EDMUND KELLS, JR., OF NEW ORLEANS, LOUISIANA, ASSIGNOR, BY MESNE ASSIGNMENTS, TO THE NATIONAL AUTOMATIC FIRE ALARM COMPANY, OF NEW YORK.

ELECTRIC FIRE-ALARM OR THERMOSTAT.

SPECIFICATION forming part of Reissued Letters Patent No. 10,791, dated December 21, 1886.

Original No. 322,612, dated July 21, 1885. Application for reissue filed August 26, 1886. Serial No. 211,961.

*To all whom it may concern:*

Be it known that I, CHARLES EDMUND KELLS, Jr., a citizen of the United States, residing in the city of New Orleans, in the parish of Orleans and State of Louisiana, have invented certain new and useful Improvements in Electric Fire-Alarms or Thermostats, of which the following is a specification.

My invention relates to that class of electric fire-alarms in which the circuit is completed on a rise in temperature by the expansion of one of the electrodes. Such contact has been caused by the expansion of a liquid or the melting of a fusible plug.

The object of my invention is, generally, to secure a cheap, simple, and efficient fire-alarm, which will operate by the direct movement of one of the electrodes on the application of heat.

Speaking more specifically, my invention particularly consists in a thermostatic diaphragm, disk, plate, or body which is rigidly confined at opposite edges, whereby the expansion caused by an increased temperature will operate to cause the lateral bulging of the thermostatic body to complete the electric circuit, expansion in the direction of the opposite rigidly-secured edges being prevented.

The invention further consists in such thermostatic diaphragm, disk, plate, or body combined with a frame in such manner that the electrodes of the circuit will be completely inclosed in a dust-proof case.

The invention further consists in a thermostatic diaphragm, disk, plate, or body with a flat portion at the points where it is secured to the thermostat frame or case, and between such points, giving the bulging or expanding body a concavo-convex shape.

The invention further consists in a thermostat in which a thermostatic diaphragm, disk, plate, or body is combined with a casing or support in such manner that the thermostatic body is uncovered or directly exposed to the atmosphere, and yet the electrodes are inclosed in a dust-proof chamber.

As one way of attaining these ends in a practical and efficient manner, the structure herein shown and described is preferred by me. In the organization illustrated I have shown a thin concavo-convex metallic diaphragm or disk secured around its edges to an unyielding support in proximity to an adjustable contact-point, the diaphragm constituting one electrode or terminal of an electric circuit of which the contact-point constitutes the other, the circuit being closed on the application of heat by the bulging or expansion of the diaphragm into contact with the electrode.

The subject-matter claimed is hereinafter specified.

Figure 2:
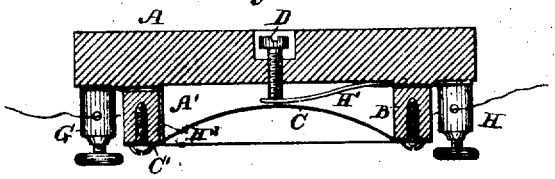

In the accompanying drawings, which represent my improved apparatus as constructed in the best way now known to me, Figure 1 is a face view of the entire apparatus, including the battery and alarm indicator, and Fig. 2 a vertical transverse central section through the thermostat proper.

In the preferred construction illustrated the frame of the instrument or support of the apparatus is shown as consisting of a circular piece, A, of wood, rubber, or other material, preferably a non conductor of electricity, provided with a central recess, A′, thereby forming an annular ridge, B, upon one side thereof. A thin concavo-convex metallic plate or diaphragm, C, preferably made of zinc, is provided with a flat annular rim or flange, C′, securely fastened to the ridge by nails driven through the rim into the ridge. An adjustable screw, D, is inserted in the frame A in such manner that its inner end will face the outer or convex surface of the diaphragm. The support A is provided with two binding-posts, G H, the former of which is electrically connected with the diaphragm by means of a metallic strip, H′, and the latter with a screw, D, by means of a corresponding strip, H′. The binding-post G is electrically connected by suitable wires with a battery, E, which is in turn correspondingly connected with the binding-post H through the electric bell F, constituting an alarm-indicator. It will thus be seen that the diaphragm constitutes one electrode or terminal of the circuit, while the adjustable contact constitutes the other contact-point, electrode, or terminal of said circuit. This screw can be so adjuste that the diaphragm will come in contact with the strip H sooner or later, as desired—that is, the instrument can be adjusted to give an alarm at any desired increase of temperature or degree of heat. If the temperature of the room in which the fire-alarm is located increases beyond the point of safety, the diaphragm expands or bulges until its convex side comes in contact with the adjustable contact, which closes the circuit and actuates the indicator or alarm.

As my improved apparatus operates directly by the bulging of the diaphragm against a contact-point without the intervention of expanding springs, fluids, or gases, its simplicity and efficiency will readily be perceived without further amplification. It will be observed, however, that the diaphragm being supported or rigidly held at its edge, expansion in the direction of such supports is prevented, and therefore the bulging of the diaphragm takes place. It will also be noticed that with the construction shown the electrodes are inclosed within the closed casing formed by the frame A and the thermostatic diaphragm, and are therefore protected from dust and dirt; and, further, that the expanding thermostatic body is exposed to the direct action of the heat.

A non-conducting frame, A, is preferable, because it is not necessary to insulate the electrode-adjusting screw or the expanding thermostatic body when it is a conductor of electricity.

I claim as my invention—

1. The combination of a thermostatic expanding plate or solid body, and a support or frame in which said body is confined at opposite edges against expansion, and the electrodes or terminals of an electric circuit operated by the lateral bulging caused by the expansion of the thermostatic body.

2. The combination of a thermostatic expanding plate or solid body which is expanded by the direct action of the heat upon it, a frame or support in which said thermostatic body is mounted in such manner as to form a side or portion of an inclosed or dust-proof chamber between the frame and the thermostatic body, and the electrodes of the electric circuit placed within said closed dust-proof chamber.

3. The combination of the expanding thermostatic disk or plate which is expanded by the direct action of the heat upon it, a frame or support in which said plate is secured in such manner that its expanding portion is directly exposed to the atmosphere, and the circuit-electrodes inclosed in a dust-proof chamber between said disk and frame.

4. The combination of the expanding thermostatic disk or plate which is expanded by the direct action of the heat upon it, formed with a flat portion at opposite sides for securing it to the thermostatic frame, and an intermediate concavo-convex portion.

5. In a thermostat, an expanding thermostatic metallic circular plate which is expanded by the direct action of the heat upon it, formed with an annular flat rim, and an intermediate concavo-convex portion, in combination with a support or frame and the terminals of an electric circuit.

6. The combination of a supporting-frame, a concavo-convex expanding thermostatic diaphragm or disk which is expanded by the direct action of the heat upon it, rigidly connected therewith near its opposite edges, and an electric circuit having electrodes operated by the expansion of the diaphragm.

7. The combination of a circular expanding thermostatic disk or diaphragm which is expanded by the direct action of the heat upon it, the supporting-frame in which said diaphragm is rigidly connected around its edge, and the terminals of the electric circuit.

8. The combination, substantially as herein set forth, of the unyielding non-conducting frame, the concavo-convex metallic diaphragm rigidly connected therewith near its edge, constituting one electrode of an electric circuit, and an adjustable contact-point constituting another electrode thereof, to complete the circuit by the direct expansion of the diaphragm when exposed to a high temperature.

9. The combination, substantially as herein set forth, of the unyielding non-conducting frame, the concavo-convex metallic diaphragm rigidly connected therewith near its edge, constituting one electrode of an electric circuit, an adjustable contact-point constituting the other electrode, a battery, an alarm-indicator, and electrical connections including the battery, alarm, contact-point, and diaphragm in the circuit, to give notice when the diaphragm expands into contact by the application of heat.

In testimony whereof I have hereunto subscribed my name.

CHARLES EDMUND KELLS, JR.

Witnesses:

FRANK A. HELMER,
FRANK J. SMITH.